US009279369B2

(12) United States Patent
Romoser et al.

(10) Patent No.: US 9,279,369 B2
(45) Date of Patent: Mar. 8, 2016

(54) TURBOMACHINE WITH TRANSITION PIECE HAVING DILUTION HOLES AND FUEL INJECTION SYSTEM COUPLED TO TRANSITION PIECE

(71) Applicant: General Electric Company, Schenectady, NY (US)

(72) Inventors: Carey Edward Romoser, Simpsonville, SC (US); Derrick Walter Simons, Greer, SC (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 13/799,764

(22) Filed: Mar. 13, 2013

(65) Prior Publication Data

US 2014/0260261 A1 Sep. 18, 2014

(51) Int. Cl.
*F02C 1/00* (2006.01)
*F02C 7/12* (2006.01)
*F02C 7/22* (2006.01)
*F01D 9/02* (2006.01)
*F23R 3/34* (2006.01)

(52) U.S. Cl.
CPC . *F02C 7/22* (2013.01); *F01D 9/023* (2013.01); *F23R 3/34* (2013.01)

(58) Field of Classification Search
CPC ............ F01D 9/023; F23R 3/002; F23R 3/06; F23R 2900/03041; F23R 3/08
USPC .................. 60/752–760, 806, 39.17
See application file for complete search history.

(56) References Cited

U.S. PATENT DOCUMENTS

| | | | |
|---|---|---|---|
| 3,747,336 A | 7/1973 | Dibelius et al. | |
| 4,112,676 A * | 9/1978 | DeCorso | F23R 3/007 60/753 |
| 4,173,118 A | 11/1979 | Kawaguchi | |
| 4,893,467 A | 1/1990 | Woodson | |
| 4,969,324 A | 11/1990 | Woodson | |
| 5,540,045 A | 7/1996 | Corbett et al. | |
| 6,370,862 B1 | 4/2002 | Cheng | |
| 6,502,403 B1 | 1/2003 | Tazaki et al. | |
| 8,151,553 B1 | 4/2012 | Schechter | |
| 2005/0279099 A1* | 12/2005 | Zborovsky | F01D 9/023 60/752 |
| 2006/0130484 A1* | 6/2006 | Marcum | F01D 9/023 60/752 |

(Continued)

*Primary Examiner* — Thai Ba Trieu
*Assistant Examiner* — Ngoc T Nguyen
(74) *Attorney, Agent, or Firm* — Ernest G. Cusick; Frank A. Landgraff

(57) ABSTRACT

A turbomachine is provided and includes a combustor in which fuel and air are combusted, a turbine disposed for reception of products of combustion from the combustor, a transition piece fluidly interposed between the combustor and the turbine and including a body formed to define dilution holes configured to allow air to enter the combustor and for enabling steam injection toward a main flow of the products of the combustion proceeding from the combustor to the turbine and a fuel injection system supportively coupled to the transition piece and configured to inject fuel toward the main flow of the products of the combustion to thereby restore a flame temperature of the main flow of the products of the combustion reduced by steam injection enabled by the dilution holes.

20 Claims, 2 Drawing Sheets

(56) References Cited

U.S. PATENT DOCUMENTS

| | | | |
|---|---|---|---|
| 2007/0193274 A1* | 8/2007 | Belsom | F01D 9/023 60/773 |
| 2009/0145099 A1* | 6/2009 | Jennings | F01D 9/023 60/760 |
| 2010/0077720 A1 | 4/2010 | Poyyapakkam et al. | |
| 2010/0251723 A1* | 10/2010 | Chen | F23R 3/045 60/760 |
| 2011/0185699 A1 | 8/2011 | Danis et al. | |
| 2011/0214624 A1 | 9/2011 | Abrahamsson | |
| 2012/0247112 A1* | 10/2012 | Narcus | F01D 9/023 60/759 |
| 2013/0042619 A1* | 2/2013 | Bobba | F23R 3/002 60/725 |
| 2013/0167543 A1* | 7/2013 | McMahan | F01D 9/023 60/752 |
| 2013/0291543 A1* | 11/2013 | Kim | F23R 3/002 60/725 |

* cited by examiner

TURBOMACHINE WITH TRANSITION PIECE HAVING DILUTION HOLES AND FUEL INJECTION SYSTEM COUPLED TO TRANSITION PIECE

BACKGROUND OF THE INVENTION

The subject matter disclosed herein relates to a turbomachine and, more particularly, to a turbomachine with a transition piece having dilution holes and a fuel injection system coupled to the transition piece.

A typical turbomachine includes a combustor, a turbine and a transition piece. The combustor has a head end and includes a liner extending aft from the head end. The liner is formed to define a combustion zone in which a first quantity of fuel and compressed air are mixed and combusted to produce a main flow of products of combustion. The turbine is disposed downstream from the combustor and is configured to be receptive of the products of the combustion from the combustor. Within the turbine, the products of the combustion are expanded in power generation operations.

In some turbomachines that are configured for steam injection, steam is injected into the transition piece for power augmentation and cools down the flame. The turbomachine geometries are prescribed to set fuel/air ratios and, thus, flame temperatures, for emissions compliance during steam operation.

The drawbacks of steam injection system present themselves when the turbomachine 10 is run without steam injection (i.e., during dry operations). Emissions compliance in this case can only be maintained by under-firing the gas turbine and thereby producing less power output because of the turbomachine geometries being prescribed in accordance with steam operations. If the combustor geometry is prescribed to set fuel/air ratio and, thus, flame temperature, for emissions compliance during dry operation, then the drawbacks come when the turbomachine is run with steam. Emissions compliance in this case can be maintained only by over-firing the gas turbine, which leads to diminishing hot-gas-path parts' lives.

BRIEF DESCRIPTION OF THE INVENTION

According to one aspect of the invention, a turbomachine is provided and includes a combustor in which fuel and air are combusted, a turbine disposed for reception of products of combustion from the combustor, a transition piece fluidly interposed between the combustor and the turbine and including a body formed to define dilution holes configured to allow air to enter the combustor and for enabling steam injection toward a main flow of the products of the combustion proceeding from the combustor to the turbine and a fuel injection system supportively coupled to the transition piece and configured to inject fuel toward the main flow of the products of the combustion to thereby restore a flame temperature of the main flow of the products of the combustion reduced by steam injection enabled by the dilution holes.

According to another aspect of the invention, a turbomachine is provided and includes a combustor in which a first quantity of fuel and air are combusted, a turbine disposed for reception of products of combustion from the combustor, a transition piece fluidly interposed between the combustor and the turbine and including a body formed to define dilution holes configured to allow air to enter the combustor and for enabling steam injection toward a main flow of the products of the combustion proceeding from the combustor to the turbine and a fuel injection system. The fuel injection system is supportively coupled to the transition piece and configured to inject a second quantity of fuel toward the main flow of the products of the combustion.

According to yet another aspect of the invention, a turbomachine is provided and includes a combustor in which a first quantity of fuel and air are combusted, a turbine disposed for reception of products of combustion from the combustor, a transition piece fluidly interposed between the combustor and the turbine and including a body formed to define dilution holes configured to allow air to enter the combustor and for enabling steam injection toward a main flow of the products of the combustion proceeding from the combustor to the turbine, a fuel injection system and a controller. The fuel injection system is supportively coupled to the transition piece and configured to inject a second quantity of fuel toward the main flow of the products of the combustion. The controller is operably coupled to the fuel injection system and configured to modulate relative amounts of the first and second quantities of fuel.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The description provided below relates to a turbomachine with a combination of steam injection for power augmentation and axially staged injection or late lean injection (LLI). The axially staged injection or LLI is leveraged to make steam injection power augmentation more marketable. That is, the axially staged injection or LLI for, for example, E-class heavy duty gas turbine engines, enables stable combustion throughout a significantly increased firing temperature range. This new flexibility is accomplished by diverting fuel (fuel staging) away from the flame zone to maintain compliant combustor emissions.

The axially staged injection or LLI actively "tunes" a combustor by adjusting the amount of fuel that is participating in the reaction zone. In this way, the reaction, or flame, temperature can be adjusted to compensate for the flame temperature reduction caused by the introduction of steam. The ability to adjust flame temperature and compensate for steam injection is, until now, only possible through hardware configuration changes. The combination of steam injection with late-lean injection reduces or eliminates the drawbacks of the current steam power augmentation product.

Figure 1:
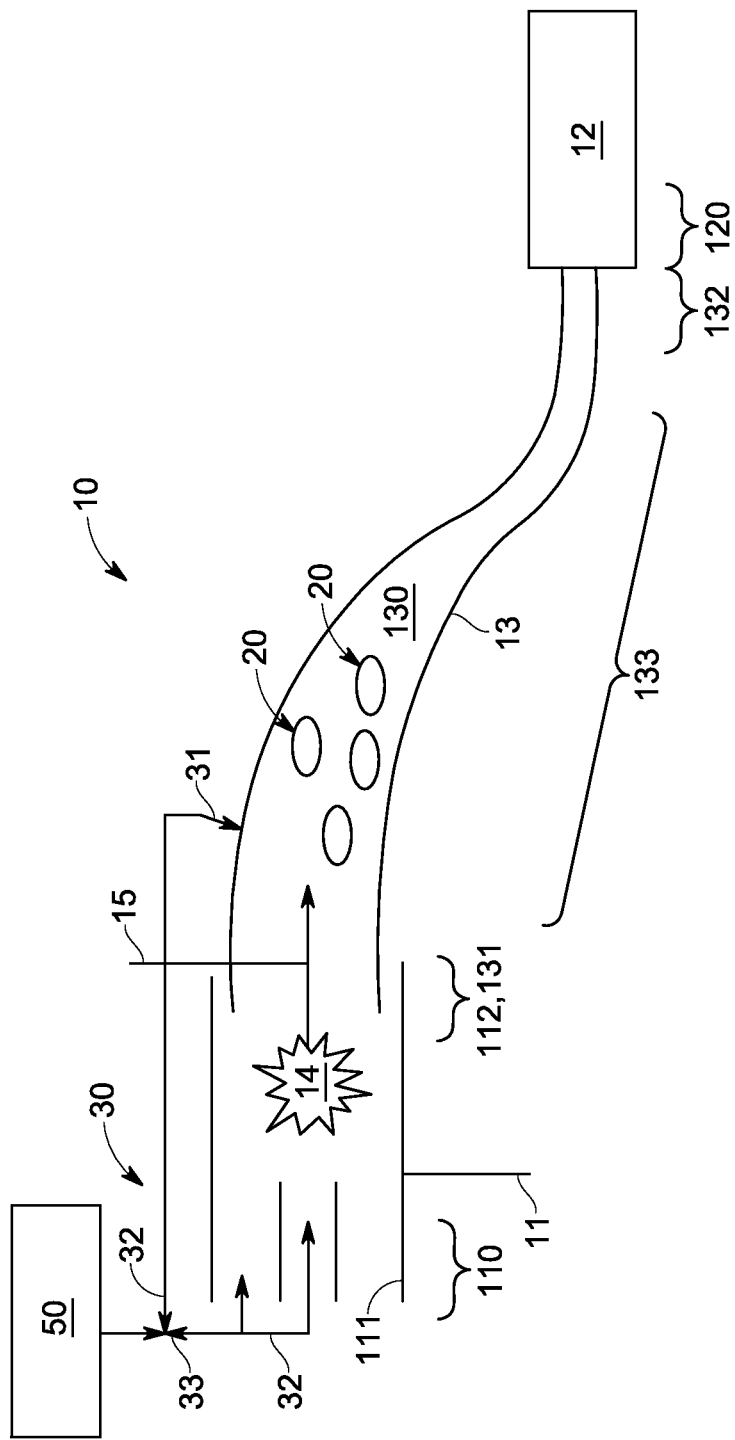
FIG. 1 is a schematic diagram of a turbomachine in accordance with embodiments.

With reference to FIG. 1, a turbomachine 10 is provided and includes a combustor 11, a turbine 12 and a transition piece 13. The combustor 11 has a head end 110 and includes a liner 111 extending aft from the head end 110. The liner 111 is formed to define a combustion zone 14 in which a first quantity of fuel and compressed air are mixed and combusted to produce a main flow 15 of products of combustion. The turbine 12 is disposed downstream from the combustor 11 and is configured to be receptive of the products of the combustion from the combustor 11. Within the turbine 12, the products of the combustion are expanded in power generation operations.

The transition piece 13 is fluidly interposed between the combustor 11 and the turbine 12. The transition piece 13 includes a body 130 having a forward portion 131, an aft portion 132 and a central portion 133. The forward portion 131 is telescopically coaxial with an aft portion 112 of the liner 111 of the combustor 11. The aft portion 132 is coupled to a forward portion 120 (i.e., a first stage) of the turbine 12. The central portion 133 extends curvilinearly from the forward portion 131 to the aft portion 132 whereby the aft portion 132 may be disposed at a radially inward location as compared to the radially outward location of the forward portion 131 in, for example, a can-annular configuration of the turbomachine 10. Along the central portion 133, the body 130 of the transition piece 13 is formed to define dilution holes 20.

The dilution holes 20 allow air to enter the combustor 11 and function in a similar manner as openings and mixing holes in the liner 111 and similar dilution holes in the transition piece 13. In particular, the dilution holes 20 along with the openings and mixing holes in the liner 111 enable steam injection from an exterior of the turbomachine 10 to an interior thereof. The steam that enters the combustor 11 via the openings and the mixing holes in the liner 111 near the head end 110 and via the dilution holes 20 is directed toward the main flow 15 of the products of the combustion proceeding from the combustor 11 to the turbine 12 and is responsible for a lowering of a flame temperature in the combustion zone 14 and the interior of the transition piece 13.

The turbomachine 10 further includes a fuel injection system 30, such as an axially staged fuel injection system or a late lean injection (LLI) system. The fuel injection system 30 is supportively coupled to the body 130 of the transition piece 13 and is configured to inject a second quantity of fuel into the interior of the transition piece 13 and toward the main flow of the products of the combustion. The fuel injection system 30 may include at least one fuel injector 31, a fuel circuit 32 and at least one valve assembly 33. The at least one fuel injector 31 may be supportively coupled to the body 130 of the transition piece 13 such that the second quantity of fuel is injectable toward the interior of the transition piece 13 and toward the main flow of the products of combustion. The fuel circuit 32 is configured to deliver the first quantity of fuel to the head end 110 of the combustor 11 and is coupled to the at least one fuel injector 31. Thus, the fuel circuit 32 is further configured to deliver the second quantity of fuel to the at least one fuel injector 31.

The at least one valve assembly 33 may be manually or automatically controllable to permit relative amounts of the first and second quantities of fuel to be deliverable to the head end 110 and the at least one fuel injector 31, respectively. Although illustrated in FIG. 1 as a 3-way valve, it will be understood that this is merely exemplary and that other embodiments exist. For example, in an alternative embodiment a pair of 2-way valves can be operably disposed along the lines of the fuel circuit 32 that deliver the first and second quantities of fuel to the head end 110 and the at least one fuel injector 31.

Figure 2:
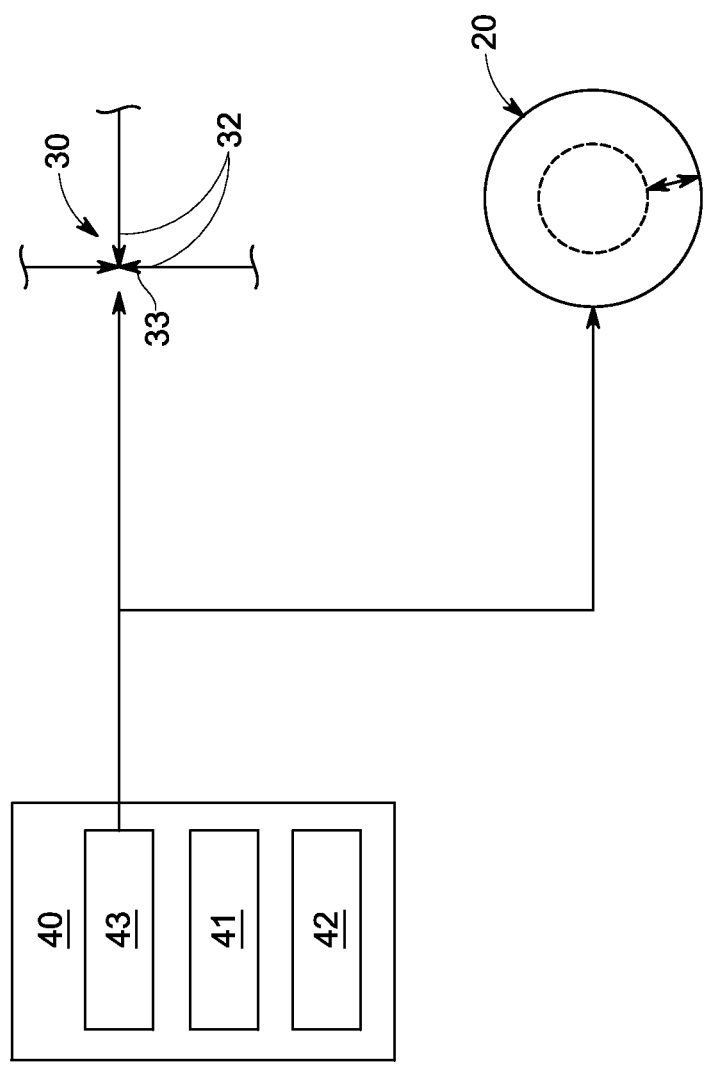
FIG. 2 is a schematic diagram of a controller of the turbomachine in accordance with embodiments.

With reference to FIG. 2, the turbomachine 10 may further include a controller 40. The controller 40 may be embodied as a computer or machine readable medium including a processing unit 41, a memory 42 and a servo unit 43. The memory 42 may have executable instructions stored thereon, which, when executed, cause the processing unit 41 to execute the methods described herein. For example, the servo unit 43 of the controller 40 may be operably coupled to the at least one valve assembly 33 of the fuel injection system 30 and may be thereby configured to modulate the relative amounts of the first and second quantities of fuel that are deliverable to the head end 110 and at least one fuel injector 31. That is, the executable instructions, when executed, may cause the processing unit 41 to instruct the servo unit 43 to operate the at least one valve assembly 33 to accordingly permit an increase or decrease in the respective amounts of the first quantity of fuel that is deliverable to the head end 110 and of the second quantity of fuel that is deliverable to the at least one fuel injector 31.

In accordance with embodiments, the controller 40 is configured to modulate the relative amounts of the first and second quantities of fuel in accordance with a predefined schedule or in accordance with one of a steam operational mode being initiated and a dry operational mode being initiated.

For example, the controller 40 may be configured to cause the second quantity of fuel that is divertable or deliverable from the head end 110 and to the at least one fuel injector 31 to be 0% (e.g., during steam injection operations of the turbomachine 10) to about 20% (e.g., during dry operations of the turbomachine 10) of an available fuel supply 50 (see FIG. 1). In accordance with further embodiments, the controller 40 may be configured to cause the second quantity of fuel to be divertable or deliverable from the head end 110 and to the at least one fuel injector 31 to be about 11% of the available fuel supply 50.

The diversion of the second quantity of the fuel to the at least one fuel injector 31 allows an increased quantity of fuel to be injected into the body 130 of the transition piece 13 such that the increased quantity of the fuel is injectable toward the interior of the transition piece 13 and the main flow of the products of combustion. Where ingress of steam into the combustor 11 via the openings and the mixing holes in the liner 111 near the head end 110 lowers the flame temperature in the combustion zone 14, the injection of the increased quantity of fuel into the body 130 of the transition piece 13 toward the interior of the transition piece 13 and the main flow of the products of combustion restores the flame temperature. This flame temperature restoration results in a more complete combustion of the fuel and a decrease in pollutant emissions and was formally possible only with configuration and/or component geometry changes.

Still referring to FIG. 2, the controller 40 may also be operably coupled to the dilution holes 20 and the dilution holes 20 may be provided with actively controllable geometries. Thus, the controller 40 may be able to actively control the geometries (e.g., by enlarging or reducing dilution hole 20 diameters) of one or more of the dilution holes 20 in accordance with varying operational conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine, comprising:
   a combustor in which a first quantity of fuel and air are combusted;
   a turbine disposed for reception of products of combustion from the combustor;
   a transition piece fluidly interposed between the combustor and the turbine and including a body formed to define dilution holes configured to allow air to enter the combustor and for enabling steam injection toward a main flow of the products of the combustion proceeding from the combustor to the turbine; and
   a fuel injection system supportively coupled to the transition piece and configured to inject a second quantity of fuel toward the main flow of the products of the combustion.

2. The turbomachine according to claim 1, wherein the body of the transition piece comprises:
   a forward portion, which is coaxial with an aft portion of the combustor;
   a transition piece aft portion, which is coupled to a forward portion of the turbine; and
   a central portion, which extends curvilinearly from the forward portion to the transition piece aft portion.

3. The turbomachine according to claim 1, wherein the fuel injection system comprises:
   at least one fuel injector by which the second quantity of fuel is injectable toward the main flow of the products of combustion; and
   a fuel circuit configured to deliver the first quantity of fuel to a head end of the combustor and to deliver the second quantity of fuel to the at least one fuel injector.

4. The turbomachine according to claim 1, wherein the second quantity of fuel is 0% to 20% of an available fuel supply.

5. The turbomachine according to claim 1, the second quantity of fuel is 11% of an available fuel supply.

6. The turbomachine according to claim 1, wherein the dilution holes have active geometries.

7. A turbomachine, comprising:
   a combustor in which fuel and air are combusted;
   a turbine disposed for reception of products of combustion from the combustor;
   a transition piece fluidly interposed between the combustor and the turbine and including a body formed to define dilution holes configured to allow air to enter the combustor and for enabling steam injection toward a main flow of the products of the combustion proceeding from the combustor to the turbine; and
   a fuel injection system supportively coupled to the transition piece and configured to inject fuel toward the main flow of the products of the combustion to thereby restore a flame temperature of the main flow of the products of the combustion reduced by steam injection enabled by the dilution holes.

8. The turbomachine according to claim 7, wherein the body of the transition piece comprises:
   a forward portion, which is coaxial with an aft portion of the combustor;
   a transition piece aft portion, which is coupled to a forward portion of the turbine; and
   a central portion, which extends curvilinearly from the forward portion to the transition piece aft portion.

9. The turbomachine according to claim 7, wherein the fuel injection system comprises:
   at least one fuel injector by which fuel is injectable toward the main flow of the products of combustion; and
   a fuel circuit configured to deliver fuel to a head end of the combustor and to the at least one fuel injector.

10. The turbomachine according to claim 7, wherein 0% to 20% of an available fuel supply is injectable toward the main flow of the products of the combustion.

11. The turbomachine according to claim 7, wherein 11% of an available fuel supply is injectable toward the main flow of the products of the combustion.

12. The turbomachine according to claim 7, wherein the dilution holes have active geometries.

13. A turbomachine, comprising:
   a combustor in which a first quantity of fuel and air are combusted;
   a turbine disposed for reception of products of combustion from the combustor;
   a transition piece fluidly interposed between the combustor and the turbine and including a body formed to define dilution holes configured to allow air to enter the combustor and for enabling steam injection toward a main flow of the products of the combustion proceeding from the combustor to the turbine;
   a fuel injection system supportively coupled to the transition piece and configured to inject a second quantity of fuel toward the main flow of the products of the combustion; and
   a controller operably coupled to the fuel injection system and configured to modulate relative amounts of the first and second quantities of fuel.

14. The turbomachine according to claim 13, wherein the body of the transition piece comprises:
   a forward portion, which is coaxial with an aft portion of the combustor;
   a transition piece aft portion, which is coupled to a forward portion of the turbine; and
   a central portion, which extends curvilinearly from the forward portion to the transition piece aft portion.

15. The turbomachine according to claim 13, wherein the fuel injection system comprises:
   at least one fuel injector by which the second quantity of fuel is injectable toward the main flow of the products of combustion; and
   a fuel circuit configured to deliver the first quantity of fuel to a head end of the combustor and to deliver the second quantity of fuel to the at least one fuel injector.

16. The turbomachine according to claim 13, wherein the controller is configured to cause the second quantity of fuel to be 0% to 20% of an available fuel supply.

17. The turbomachine according to claim 13, wherein the controller is configured to cause the second quantity of fuel to be 11% of an available fuel supply.

18. The turbomachine according to claim 13, wherein the controller is configured to modulate the relative amounts of the first and second quantities of fuel in accordance with a predefined schedule.

19. The turbomachine according to claim 13, wherein the controller is configured to modulate the relative amounts of the first and second quantities of fuel in accordance with one of:
   a steam operational mode being initiated; and
   a dry operational mode being initiated.

20. The turbomachine according to claim 13, wherein the dilution holes have active geometries and are operably coupled to the controller, the controller being further configured to control the active geometries of the dilution holes.

* * * * *